United States Patent
Shei et al.

(10) Patent No.: US 10,330,860 B2
(45) Date of Patent: Jun. 25, 2019

(54) COVER PLATE STRUCTURE AND DISPLAY DEVICE

(71) Applicant: E Ink Holdings Inc., Hsinchu (TW)

(72) Inventors: Tsai-Wei Shei, Hsinchu (TW); Cheng-Hsien Lin, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/867,741

(22) Filed: Jan. 11, 2018

(65) Prior Publication Data

US 2018/0252862 A1  Sep. 6, 2018

(30) Foreign Application Priority Data

Mar. 2, 2017 (CN) .......................... 2017 1 0119280

(51) Int. Cl.
*F21V 7/04* (2006.01)
*F21V 8/00* (2006.01)
*G06F 3/041* (2006.01)

(52) U.S. Cl.
CPC .......... *G02B 6/0093* (2013.01); *G06F 3/0412* (2013.01); *G02B 6/0055* (2013.01); *G02B 6/0088* (2013.01); *G02B 6/0091* (2013.01); *G06F 3/041* (2013.01); *G06F 2203/04103* (2013.01); *G06F 2203/04107* (2013.01)

(58) Field of Classification Search
CPC combination set(s) only.
See application file for complete search history.

(56) References Cited

U.S. PATENT DOCUMENTS

| | | | |
|---|---|---|---|
| 7,290,803 B2 | 11/2007 | Scarbrough et al. | |
| 8,508,701 B2 | 8/2013 | Nakagawa et al. | |
| 8,866,983 B2 | 10/2014 | Ai et al. | |
| 2003/0205895 A1 | 11/2003 | Scarbrough et al. | |
| 2016/0334843 A1* | 11/2016 | Uto | G02F 1/133385 |
| 2017/0147850 A1* | 5/2017 | Liu | G06K 9/0002 |

FOREIGN PATENT DOCUMENTS

| | | |
|---|---|---|
| CN | 203397317 U | 1/2014 |
| CN | 205281983 U | 6/2016 |
| TW | I406915 B | 9/2013 |
| TW | I472799 B | 2/2015 |

OTHER PUBLICATIONS

Corresponding Taiwanese office action dated Oct. 5, 2017.

* cited by examiner

*Primary Examiner* — Ali Alavi
(74) *Attorney, Agent, or Firm* — CKC & Partners Co., LLC

(57) ABSTRACT

A cover plate structure for a display device is provided. The cover plate structure includes a light-transmitting substrate, a light-shielding layer, and a light-transmitting covering layer. The light-transmitting substrate has a flat upper surface and a lower surface. The light-shielding layer is disposed on an edge of the flat upper surface of the light-transmitting substrate and in direct contact with the flat upper surface. The light-transmitting covering layer is located on the light-shielding layer and the light-transmitting substrate.

15 Claims, 12 Drawing Sheets

COVER PLATE STRUCTURE AND DISPLAY DEVICE

CROSS-REFERENCE TO RELATED APPLICATION

This application claims priority to China Application Serial Number 201710119280.1, filed Mar. 2, 2017, the disclosures of which are incorporated herein by reference in their entireties.

BACKGROUND

Field of Invention

The present invention relates to a cover plate structure and a display device.

Description of Related Art

With the advance of science and technology, various display devices, e.g. reflective displays, have been developed. The reflective displays present information in visual by reflecting light emitted from the outside light source; thus, no backlight is required, and they are light and thin as well as power-saving. However, when there is no outside light source, the reflective displays cannot present visual information. As a result, for extending the applicability of the reflective displays, front light modules are often utilized to provide sufficient light for the devices.

In general, a front light module includes a light source, a light guide plate and a protective cover printed with an ink layer. The protective cover is adhered to the light guide plate through the ink-printed surface. Nonetheless, in order to protect the light guide plate, the protective cover often has greater thickness, resulting in greater distance between the outer surface of the protective cover and the ink layer. After light is transmitted into the protective layer from the light guide plate, the light is easily reflected between the outer surface of the protective cover and the ink layer, and then is emitted from the outer surface thereof, thereby causing light leakage around the ink layer and further having negative impact on display qualities of the reflective displays. Similarly, the light leakage mentioned above also occurs when a reflective display reflects incident light from an outer light source. Moreover, the light leakage problem becomes even worse as a light color is chosen for the ink layer.

SUMMARY

The present disclosure provides a cover plate structure for a display device. The cover plate structure includes a light-transmitting substrate, a first light-shielding layer, and a light-transmitting covering layer. The light-transmitting substrate has a flat upper surface and a lower surface. The light-transmitting covering layer is over the light-transmitting substrate. The first light-shielding layer is disposed between the light-transmitting substrate and the light-transmitting covering layer, and is located on an edge of the flat upper surface of the light-transmitting substrate and in contact with the flat upper surface. A total thickness of the first light-shielding layer and the light-transmitting covering layer accounts for 1%-33% of a total thickness of the light-transmitting substrate, the first light-shielding layer and the light-transmitting covering layer.

In one embodiment, the light-transmitting covering layer includes a hard coating layer (HC layer), an anti-glare layer (AG layer), or a combination thereof.

In one embodiment, the light-transmitting covering layer conformally covers the first light-shielding layer and the light-transmitting substrate.

In one embodiment, the light-transmitting covering layer includes an optically adhesive layer and a hard coating layer, and the hard coating layer is disposed on the optically adhesive layer.

In one embodiment, the light-transmitting covering layer includes an optically adhesive layer and an anti-glare layer, and the anti-glare layer is disposed on the optically adhesive layer.

In one embodiment, a material of the light-transmitting substrate includes glass, polymethylmethacrylate (PMMA), polycarbonate (PC), polyethylene terephthalate (PET), cyclo-olefin polymer (COP), cyclic olefin copolymer (COC), polyethylene (PE), polyetheretherketone (PEEK), polyethylene naphthalate (PEN), polyimide (PI), polyetherimide (PEI), or a combination thereof.

In one embodiment, the cover plate structure for the display device further includes a second light-shielding layer disposed on an edge of the lower surface of the light-transmitting substrate.

The present disclosure provides a display device. The display device includes a reflective display and a cover plate structure. The cover plate structure is disposed on the reflective display. The cover plate structure includes a light-transmitting substrate, a first light-shielding layer, and a light-transmitting covering layer. The light-transmitting substrate has a flat upper surface and a lower surface. The light-transmitting covering layer is over the light-transmitting substrate. The first light-shielding layer is disposed between the light-transmitting substrate and the light-transmitting covering layer, and is located on an edge of the flat upper surface of the light-transmitting substrate and in contact with the flat upper surface. A total thickness of the first light-shielding layer and the light-transmitting covering layer accounts for 1%-33% of a total thickness of the light-transmitting substrate, the first light-shielding layer and the light-transmitting covering layer.

In one embodiment, the display device further includes a touch circuit on the lower surface of the light-transmitting substrate.

In one embodiment, the display device further includes a touch panel between the reflective display and the cover plate structure.

In one embodiment, the light-transmitting covering layer includes a hard coating layer, an anti-glare layer, or a combination thereof.

In one embodiment, the display device further includes a light guide plate and a light source. The light guide plate is located between the reflective display and the cover plate structure. The light source is disposed next to a side of the light guide plate.

In one embodiment, the display device further includes a touch panel between the light guide plate and the cover plate structure.

In one embodiment, the display device further includes a touch panel between the reflective display and the light guide plate.

The present disclosure provides a cover plate structure for a display device. The cover plate structure includes a light-transmitting substrate, a light-shielding layer, and a light-transmitting covering layer. The light-transmitting substrate includes a central portion and an edge portion surrounding the central portion. A thickness of the central portion is greater than a thickness of the edge portion. The light-shielding layer is located on the edge portion. The light-transmitting covering layer is located on the light-shielding layer and the light-transmitting substrate. A material of the light-transmitting substrate includes glass, polymethylmethacrylate, polycarbonate, polyethylene terephthalate, cyclo-olefin polymer, cyclic olefin copolymer, polyethylene, polyetheretherketone, polyethylene naphthalate, polyimide, polyetherimide, or a combination thereof.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
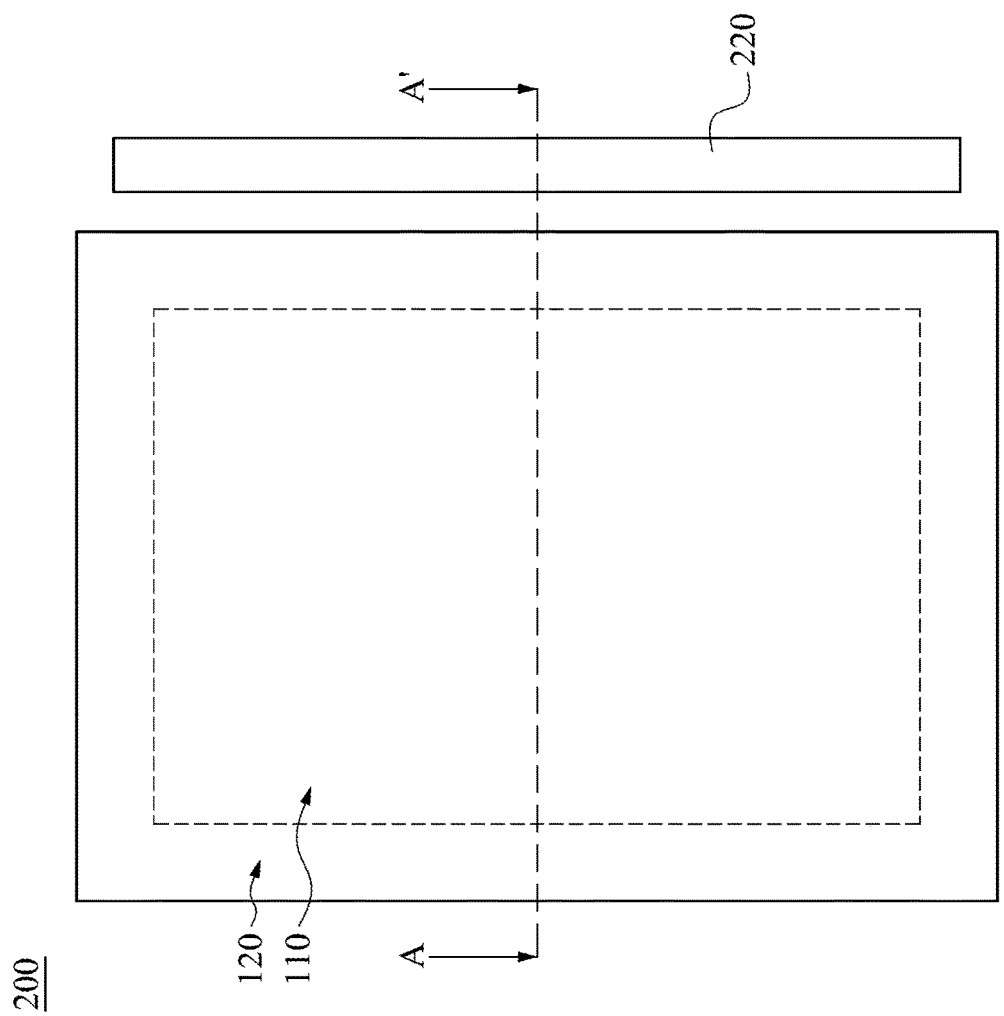
FIG. 1 is a top view of a display device 200 according to one embodiment of the present disclosure.

The objects and advantages of the invention, by following after the preferred embodiment described in detail along with the element symbol drawings, will be more significant.

In order to make the description of the present disclosure is more detailed and complete, please refer to the accompanying drawings and the various embodiments described below, identical or similar reference numerals represent identical or similar elements, and for the sake of clear explanation, the size of the element or the thickness of the display may be exaggerated, not in accordance with the original size of the plot. In addition, for the sake of simplification of the drawing, with some structural elements in the drawings will be simple schematic manner depicted. However, it should understand that the examples provided are not intended to limit the scope of the invention covered. The details of these practices on the application do not limit the present invention. That is, in some embodiments of the present invention, the details of these practices on the non-essential. The description of the structure for restricting the operation of non-execution of its order, any structure composed of elements reassembled, the device has equal efficacy to produce, it is all covered by the scope of the present invention.

Figure 2:
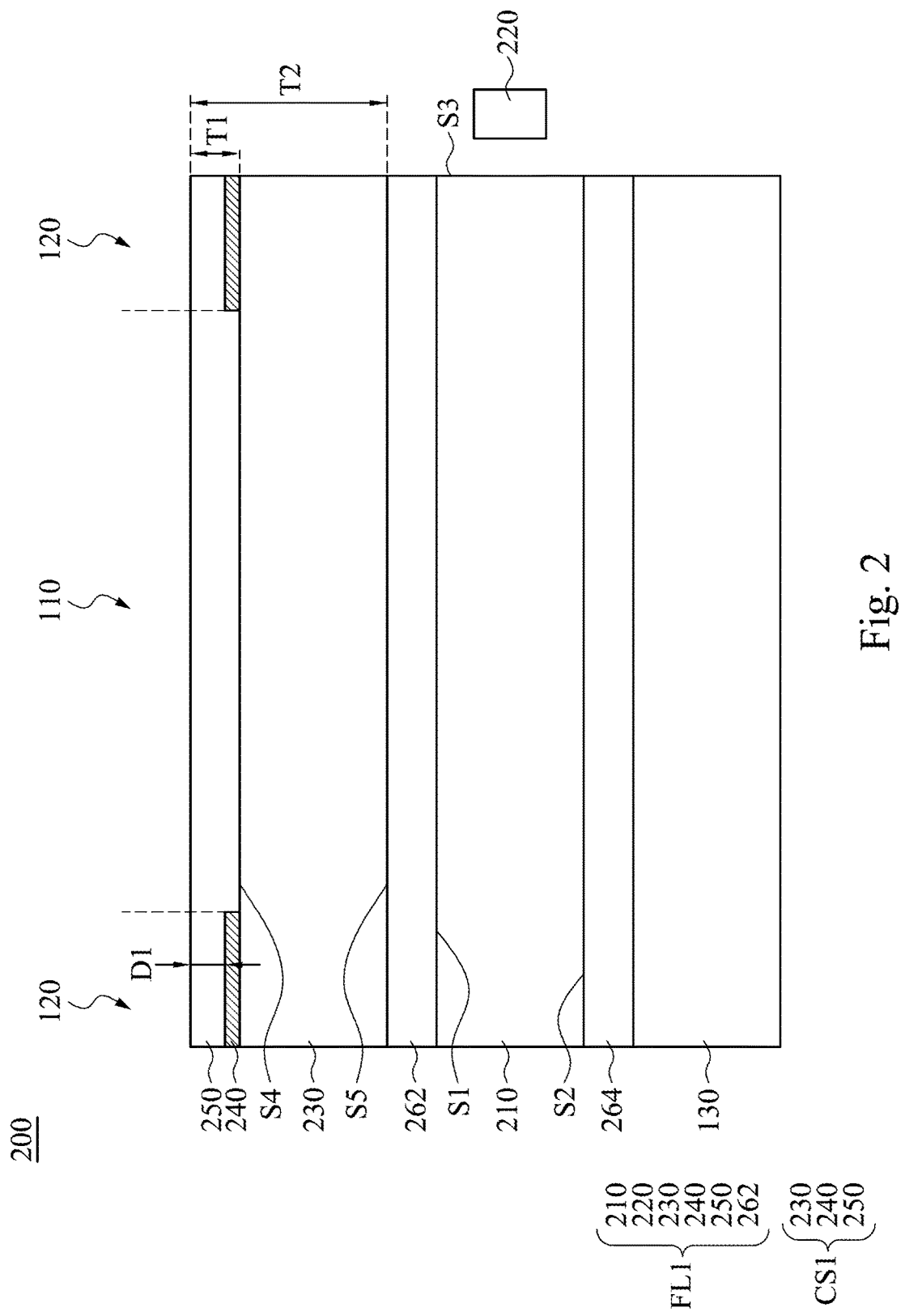
FIG. 2 is a cross-section view of the display device 200 in FIG. 1 along a line A-A'.

FIG. 1 is a top view of a display device 200 according to one embodiment of the present disclosure. FIG. 2 is a cross-section view of the display device 200 in FIG. 1 along a line A-A'. Please refer to FIG. 1 and FIG. 2 simultaneously. As shown in FIG. 1, the display device 200 is divided into a display region 110 and a non-display region 120. As shown in FIG. 2, the display device 200 includes a front light module FL1, a reflective display 130 and an optical adhesive layer 264. The front light module FL1 is disposed on the reflective display 130, and the reflective display 130 is adhered to the front light module FL1 through the optical adhesive layer 264. The optical adhesive layer 264 is an optically clear adhesive (OCA) layer or an optically clear resin (OCR) layer. In one embodiment, the optical adhesive layer 264 includes epoxy resin, phenoxy resin, acrylic resin, polyimide resin, poly-p-xylene resin, ethyl carbamate resin, silicone rubber resin, bismaleimide resin, or a combination thereof. Materials of other optical adhesive layers mentioned below can refer to the material of the optical adhesive layer 264.

In one embodiment, the reflective display 130 is an electronic paper display (EPD); hence, the display device 200 is an electronic paper display device. However, the front light module FL1 used here can still be applied to other display devices requiring front light modules.

Please refer to FIG. 1 and FIG. 2 simultaneously. The front light module FL1 includes a light guide plate 210, a light source 220, a light-transmitting substrate 230, a first light-shielding layer 240, a light-transmitting covering layer 250 and an optical adhesive layer 262. Among these, the light-transmitting substrate 230, the first light-shielding layer 240 and the light-transmitting covering layer 250 form a cover plate structure CS1. The display region 110 is the region surrounded with the first light-shielding layer 240, and the non-display region 120 is the region covered with the first light-shielding layer 240. The light guide plate 210 has an upper surface S1, a lower surface S2 and a side S3 between the upper surface S1 and the lower surface S2. The light source 220 is disposed next to the side S3 of the light guide plate 210. The light-transmitting substrate 230 is disposed on the upper surface Si of the light guide plate 210 and has a flat upper surface S4 and a lower surface S5. The first light-shielding layer 240 is disposed on the edge of the flat upper surface S4 of the light-transmitting substrate 230 and in direct contact with the flat upper surface S4. The light-transmitting covering layer 250 is located on both the first light-shielding layer 240 and the light-transmitting substrate 230.

The light-transmitting substrate 230 can function as a cover plate for protecting the light guide plate 210, and may be a rigid substrate or a flexible substrate. For instance, the light-transmitting substrate 230 is glass substrate, ceramic substrate or plastic substrate. In one embodiment, the material of the light-transmitting substrate 230 includes glass, polymethylmethacrylate (PMMA), polycarbonate (PC), polyethylene terephthalate (PET), cyclo-olefin polymers (COP), cyclic olefin copolymer (COC), polyethylene (PE), polyetheretherketone (PEEK), polyethylene naphthalate (PEN), polyimide (PI), polyetherimide (PEI) or a combination thereof. The light-transmitting substrate 230 may be a single-layer structure or a multi-layer structure. For example, the light-transmitting substrate 230 is a multi-layer structure consisted of PMMA and PC.

In one embodiment, the first light-shielding layer 240 is an ink-printed layer. Since the light-transmitting substrate 230 can be used as a substrate supporting the first light-shielding layer 240, the first light-shielding layer 240 can be fabricated onto the flat upper surface S4 of the light-transmitting substrate 230 directly through general printing technologies, e.g. spin coating, screen printing, gravure printing, slot die coating, ink jet printing, deposition, spray coating and sputtering. In one embodiment, the first light-shielding layer 240 can include a plurality of ink layers, and each ink layer can be formed by utilizing different printing technologies, making the appearance of the first light-shielding layer 240 diverse. In another embodiment, the first light-shielding layer 240 is a photoresist layer. Since the light-transmitting substrate 230 can be used as a substrate supporting the first light-shielding layer 240, the first light-shielding layer 240 can be directly fabricated onto the flat upper surface S4 of the light-transmitting substrate 230 through technologies utilized to form a photoresist. Methods used to fabricate the photoresist include steps of coating, exposure and developing. In conclusion, since an additional adhesive layer for adhering the light-transmitting substrate 230 to the first light-shielding layer 240 is not required, the cover plate structure CS1 could be lighter and thinner. The color of the first blocking layer 240 can be deep or light. The light color could be, for instance, white. Also, for satisfying various design requirement of appearance, the pattern of the first light-shielding layer 240 can be irregular. In another embodiment, the first light-shielding layer 240 can be formed onto the light-transmitting covering layer 250. Forming methods can refer to the approaches mentioned above, and therefore are not repeated herein to avoid repetition.

The light-transmitting covering layer 250 includes a hard coating layer (HC layer), an anti-glare layer (AG layer) or a combination thereof. For example, the light-transmitting covering layer 250 is a HC layer, an AG layer or a multi-layer including at least one HC layer and one AG layer. Since the HC layer and the AG layer are adhesive, the light-transmitting covering layer 250 can be in direct contact with and adhered to the upper surface of the first light-shielding layer 240. Because there is no requirement of additional adhesive for combining the light-transmitting substrate 230, the first light-shielding layer 240 and the light-transmitting covering layer 250, the cover plate structure CS1 is lighter and thinner.

In general, hard coating layers can be formed through coating a thermosetting composition or a photocurable composition onto the light-transmitting substrate 230 and the first light-shielding layer 240. In other words, the hard coating layers are adhesive and can be adhered to the light-transmitting substrate 230 and the first light-shielding layer 240. The coating technologies include, but not limited to, spin coating, dip coating, spray coating, slot die coating, rod coating, infiltration method, roller coating, gravure coating and nozzle coating.

The thermosetting composition often includes thermosetting resin, and the photocurable composition often includes photocurable resin. Thus, the hard coating layers include, but not limited to, the phenol formaldehyde resin, urea-formaldehyde resin, melamine resin, epoxy resin, unsaturated resin, polyurethane, polyimide, polyester resin, polyether resin, polyurethane resin, polyacetal resin, polybutadiene resin, polythiophene, or a combination thereof.

In general, the AG layer can be formed through the steps described below. A hard coating layer is first formed on both the light-transmitting substrate 230 and the first light-shielding layer 240, then the surface of the hard coating layer is roughened to form the anti-glare layer through sand blasting. In another embodiment, the anti-glare layer can be fabricated though the following steps. Firstly, add particles, e.g. micro-sized particles, which are used to scatter light, into the thermosetting composition or the photocurable composition. Then the particle-containing composition is coated onto the light-transmitting substrate 230 and the first light-shielding layer 240 to form the AG layer.

The AG layer includes, but not limited to, phenol formaldehyde resin, urea-formaldehyde resin, melamine resin, epoxy resin, unsaturated resin, polyurethane, polyimide, polyester resin, polyether resin, polyurethane resin, polyacetal resin, polybutadiene resin, polythiophene, or a combination thereof. In one embodiment, the AG layer further includes a plurality of particles. The particles may be inorganic particles, organic particles or a combination thereof. The material of the inorganic particles includes, but not limited to, $TiO_2$, $Al_2O_3$, $In_2O_3$, $SnO_2$, $Sb_2O_3$, $ZrO_2$, $MgF_2$, $SiO_2$, $ZnO$ and ITO. The organic particles can be, but not limited to, polymethylmethacrylate resin powder, organosilicon resin powder, polystyrene resin powder, polycarbonate resin powder, styrene acrylates resin powder, benzoguanamine resin powder, polyolefin resin powder, polyester resin powder, polyamide resin powder, polyimide resin powder, and polyfluoroethylene resin powder.

As shown in FIG. 2, a total thickness T1 of the first light-shielding layer 240 and the light-transmitting covering layer 250 accounts for 1%-33% of a total thickness T2 of the light-transmitting substrate 230, the first light-shielding layer 240 and the light-transmitting covering layer 250. In another embodiment, the total thickness T1 of the first light-shielding layer 240 and the light-transmitting covering layer 250 accounts for 1%-15% of the total thickness T2 of the light-transmitting substrate 230, the first light-shielding layer 240 and the light-transmitting covering layer 250. In one embodiment, the total thickness T1 of the first light-shielding layer 240 and the light-transmitting covering layer 250 is 5-75 μm.

In one embodiment, the light-transmitting substrate 230 is a plastic substrate. The total thickness T1 of the first light-shielding layer 240 and the light-transmitting covering layer 250 is 110-140 μm. The total thickness T2 of the light-transmitting substrate 230, the first light-shielding layer 240 and the light-transmitting covering layer 250 is 630-670 μm. In another embodiment, the light-transmitting substrate 230 is a glass substrate. The total thickness T1 of the first light-shielding layer 240 and the light-transmitting covering layer 250 is 110-140 μm. The total thickness T2 of the light-transmitting substrate 230, the first light-shielding layer 240 and the light-transmitting covering layer 250 is 530-570 μm.

Figure 3:
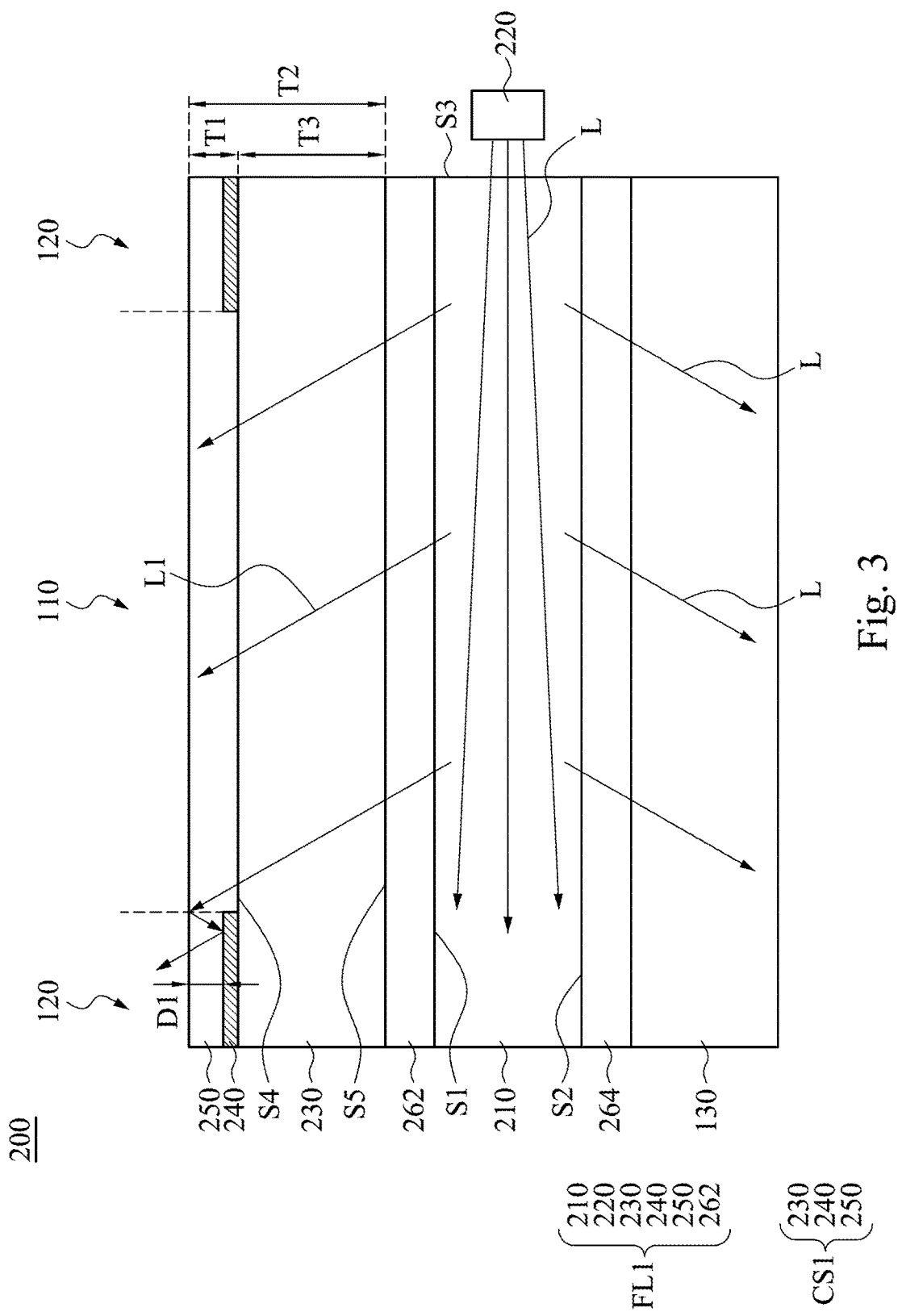
FIG. 3 is a diagram illustrating a path of a light beam passing through the display device 200 as the light source 220 in FIG. 2 radiates.

Next, please refer to FIG. 3. FIG. 3 is a diagram illustrating a path of a light beam passing through the display device 200 as the light source 220 in FIG. 2 radiates. The light source 220 emits the light beam L, and the light beam L enters into the light guide plate 210 through the side S3 of the light guide plate 210. A part of the light beam L is emitted from the lower surface S2. The light beam L emitted from the lower surface S2 then enters into the reflective display 130, and is reflected by the reflective display 130, generating reflective light beam L1. The reflective light beam L1 penetrates the optical adhesive layer 264, the light guide plate 210, the optical adhesive layer 262, the light-transmitting substrate 230 and the light-transmitting covering layer 250, then is emitted from the light-transmitting covering layer 250, transmitting images of the reflective display to spectator. In another embodiment, the light source 220 directly contacts the side S3 of the light guide plate 210. Besides, when an outer light source (not shown here) illuminates the reflective display 130, the reflective display 130 would also reflect the light beam from the outer light source, and the path of the light beam reflected from the outer light source has a similar path as the reflective light beam L1.

As shown in FIG. 3, the total thickness T1 of the first light-shielding layer 240 and the light-transmitting covering layer 250 is less than the total thickness T2 of the light-transmitting substrate 230, the first light-shielding layer 240 and the light-transmitting covering layer 250. More specifically, the total thickness T1 of the first light-shielding layer 240 and the light-transmitting covering layer 250 accounts for 1%-33% of the total thickness T2 of the light-transmitting substrate 230, the first light-shielding layer 240 and the light-transmitting covering layer 250. Therefore, under the circumstance that the light-transmitting substrate 230 has large enough thickness T3 to protect the light guide plate 210, the distance Di between the upper surface of the first light-shielding layer 240 and the upper surface of the light-transmitting covering layer 250 can be shortened as far as possible. This makes the reflective light beam L1 which is emitted from the light-transmitting covering layer 250 after reflecting between the upper surface of the light-transmitting covering layer 250 and the upper surface of the first light-shielding layer 240 decrease, and further makes the light leakage within the non-display region 120 of the display device 200 not easy to happen, improving the display performance of the display device 200.

Figure 4:
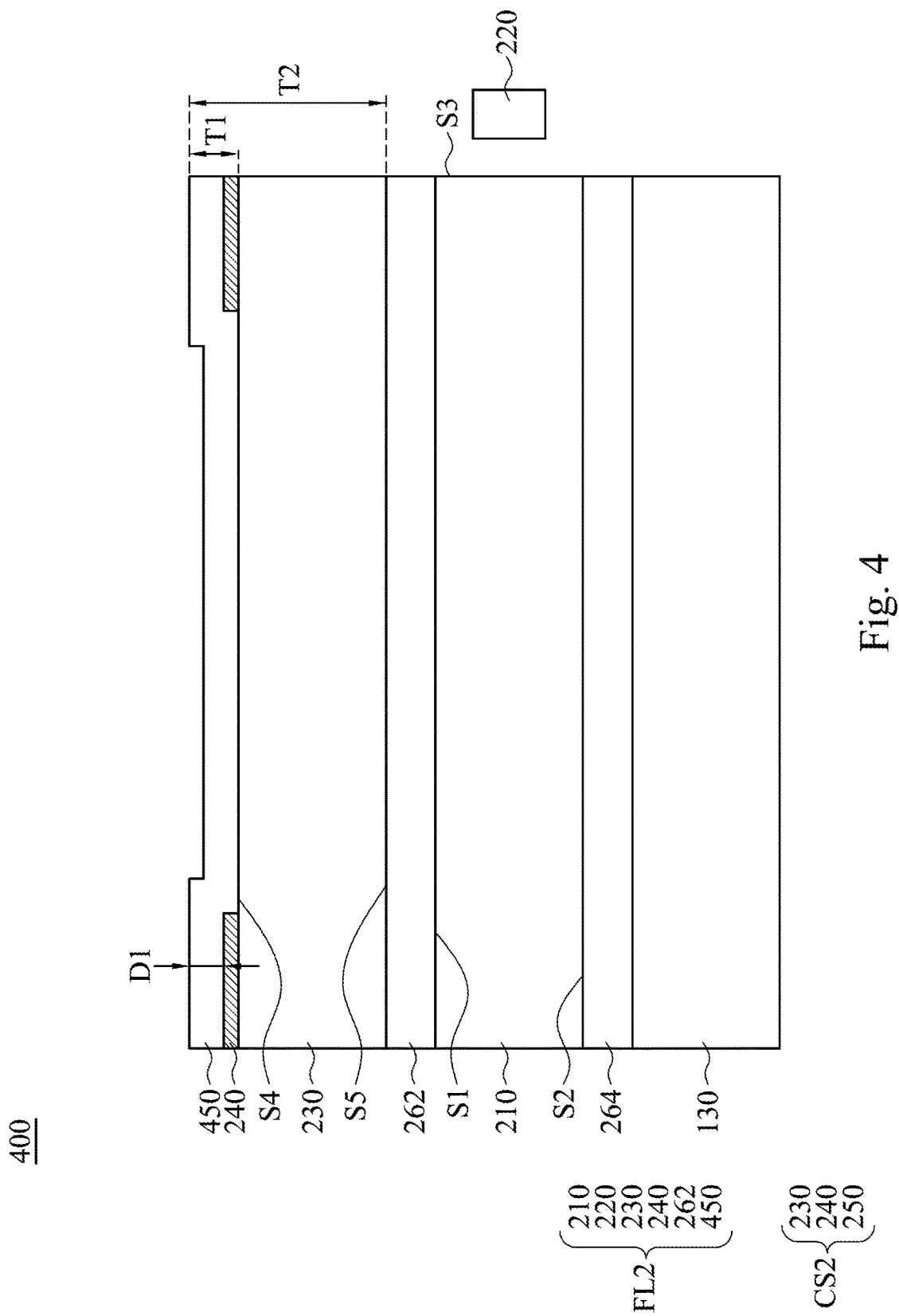
FIGS. 4-12 are cross-section views of display devices according to various embodiments of the present disclosure.

FIG. 4 is a cross-section view of a display device 400 according to another embodiment of the present disclosure. The display device 400 includes a front light module FL2, a reflective display 130 and an optical adhesive layer 264. The front light module FL2 includes a light guide plate 210, a light source 220, a light-transmitting substrate 230, a first light-shielding layer 240, a light-transmitting covering layer 450 and an optical adhesive layer 262. Among these, the light-transmitting substrate 230 along with the first light-shielding layer 240 and the light-transmitting covering layer 450 forms a cover plate structure CS2. The difference between the display device 400 in FIG. 4 and the display device 200 in FIG. 2 is that the light-transmitting covering layer 450 in the display device 400 conformally covers the first light-shielding layer 240 and the light-transmitting substrate 230.

Figure 5:
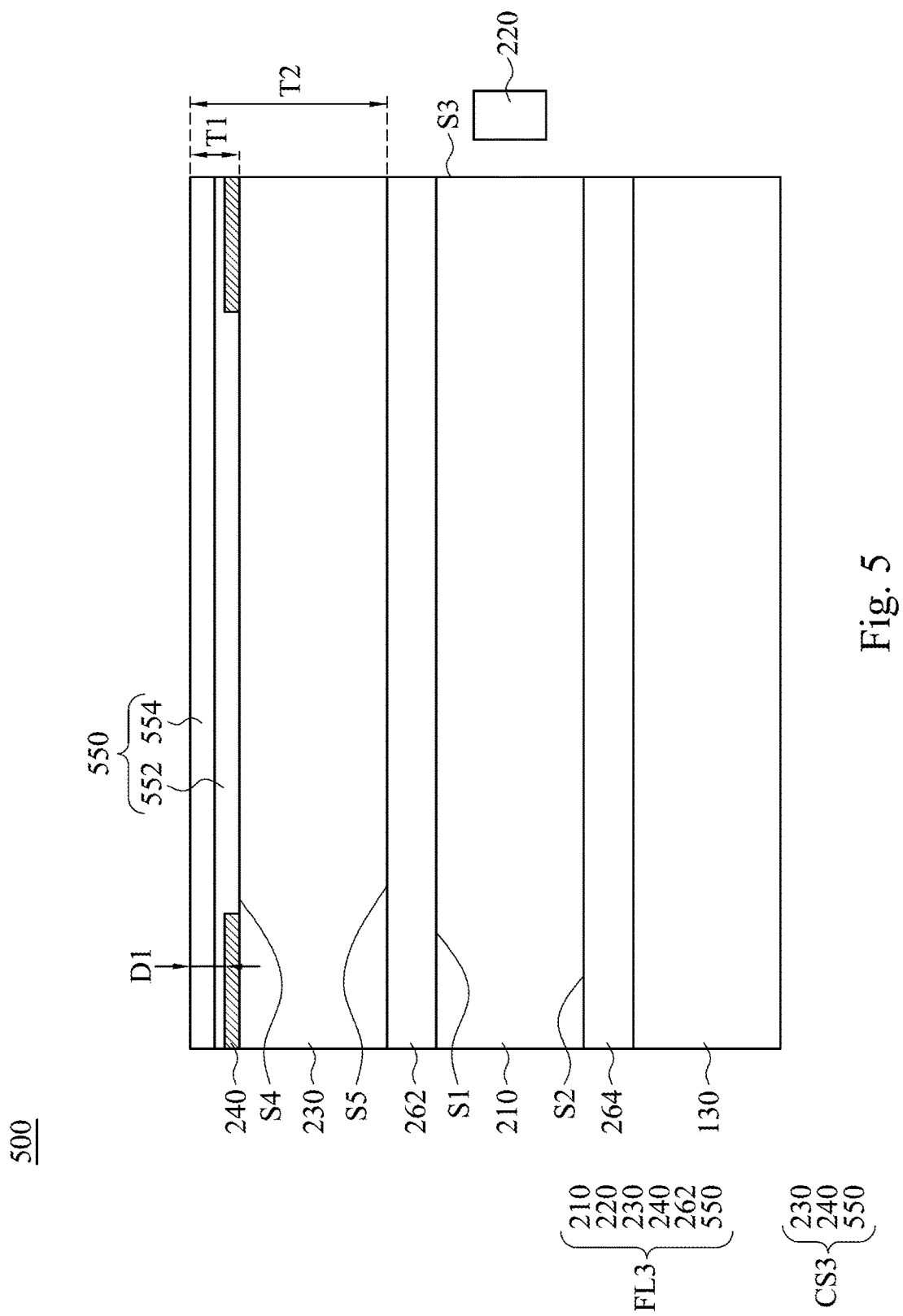

FIG. 5 is a cross-section view of a display device 500 according to another embodiment of the present disclosure. The display device 500 includes a front light module FL3, a reflective display 130 and an optical adhesive layer 264. The front light module FL3 includes a light guide plate 210, a light source 220, a light-transmitting substrate 230, a first light-shielding layer 240, a light-transmitting covering layer 550 and an optical adhesive layer 262. Among these, the light-transmitting substrate 230 along with the first light-shielding layer 240 and the light-transmitting covering layer 550 forms a cover plate structure CS3. The light-transmitting covering layer 550 includes an optical adhesive layer 552 and a functional layer 554. The functional layer 554 is disposed on the optical adhesive layer 552 and is a hard coating layer or an anti-glare layer. Though the functional layer 554 is adhesive itself, the optical adhesive layer 552 can further make the light-transmitting substrate 230, the first light-shielding layer 240 and the functional layer 554 combine together much more firmly. The difference between the display device 500 in FIG. 5 and the display device 200 in FIG. 2 is that the light-transmitting covering layer 550 in the display device 500 includes the optical adhesive layer 552 and the functional layer 554.

Figure 6:
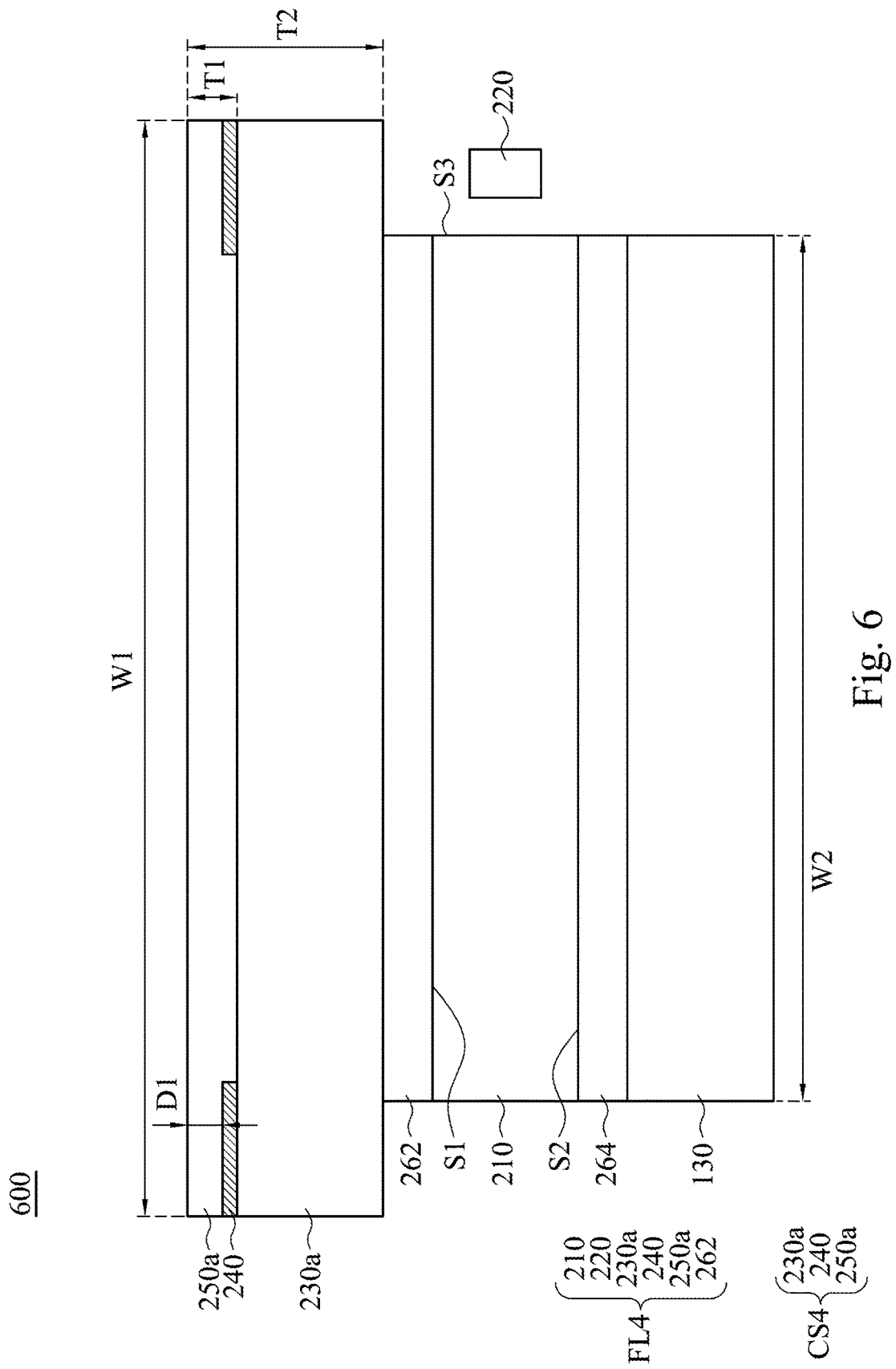

FIG. 6 is a cross-section view of a display device 600 according to another embodiment of the present disclosure. The display device 600 includes a front light module FL4, a reflective display 130 and an optical adhesive layer 264. The front light module FL4 includes a light guide plate 210, a light source 220, a light-transmitting substrate 230a, a first light-shielding layer 240, a light-transmitting covering layer 250a and an optical adhesive layer 262. Among these, the light-transmitting substrate 230a along with the first light-shielding layer 240 and the light-transmitting covering layer 250a forms a cover plate structure CS4. The difference between the display device 600 in FIG. 6 and the display device 200 in FIG. 2 is that the width W1 of the light-transmitting substrate 230a in the display device 600 is greater than the width W2 of the light guide plate 210. Namely, in the display device 600, the area of the light-transmitting substrate 230a is greater than the area of the light guide plate 210.

Figure 7:
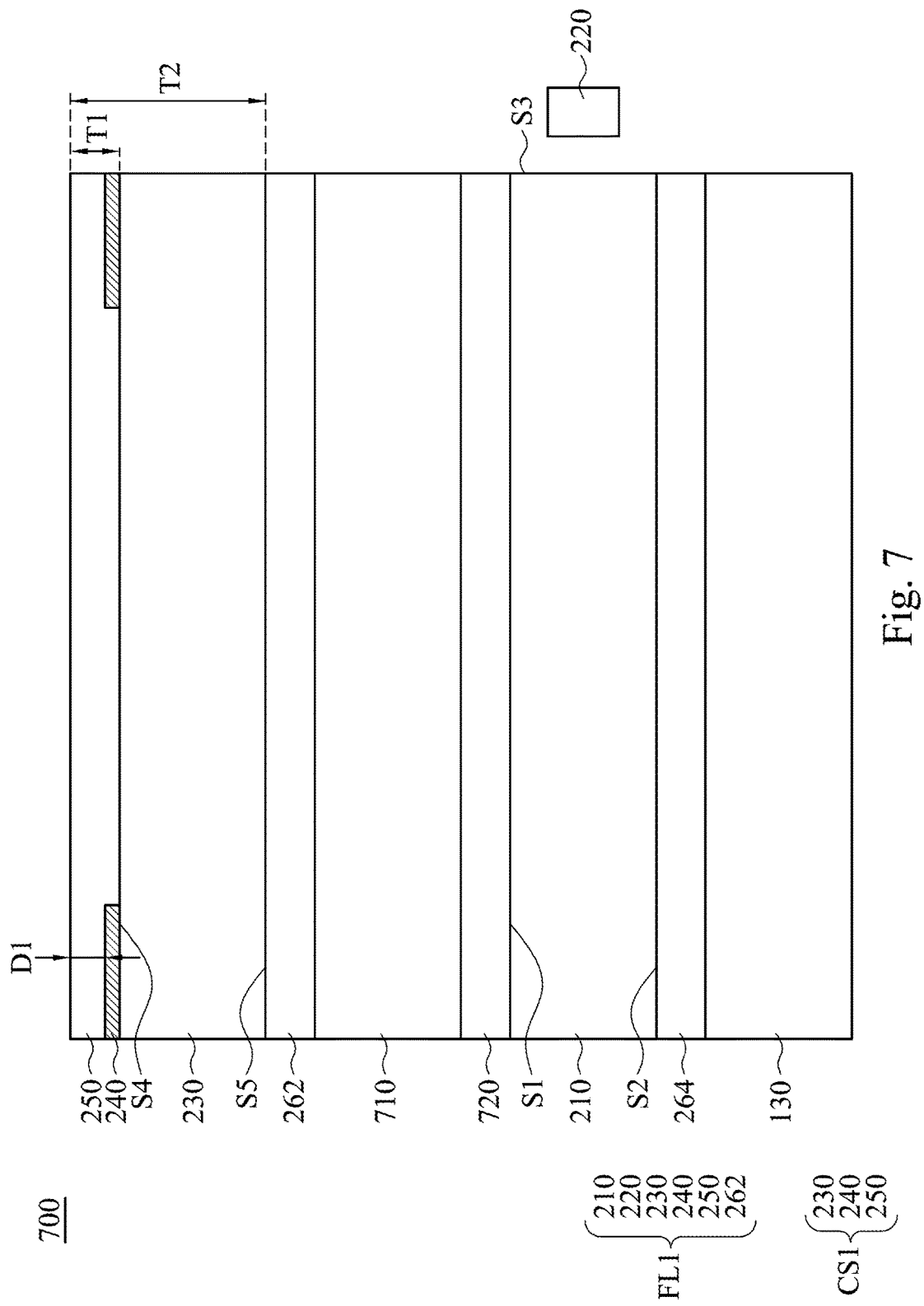

FIG. 7 is a cross-section view of a display device 700 according to another embodiment of the present disclosure. The display device 700 includes a front light module FL1, a reflective display 130, an optical adhesive layer 264, a touch panel 710 and an optical adhesive layer 720. The difference between the display device 700 in FIG. 7 and the display device 200 in FIG. 2 is that the display device 700 includes the touch panel 710 and the optical adhesive layer 720 between the light guide plate 210 and the cover plate structure CS1. The light-transmitting substrate 230 is adhered to the touch panel 710 though the optical adhesive layer 262. The light guide plate 210 is adhered to the touch panel 710 though the optical adhesive layer 720.

Figure 8:
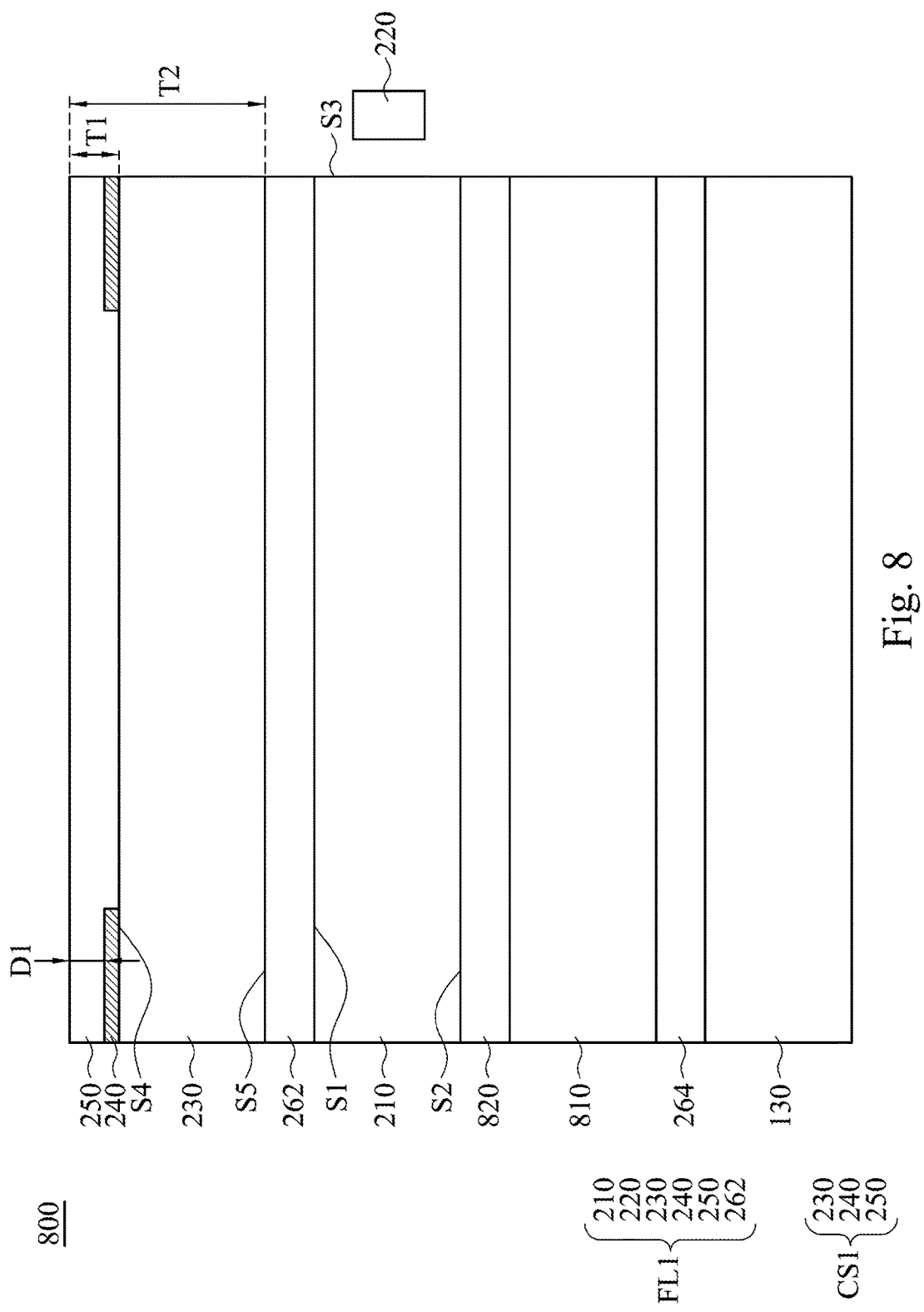

FIG. 8 is a cross-section view of a display device 800 according to another embodiment of the present disclosure. The display device 800 includes a front light module FL1, a reflective display 130, an optical adhesive layer 264, a touch panel 810 and an optical adhesive layer 820. The difference between the display device 800 in FIG. 8 and the display device 200 in FIG. 2 is that the display device 800 includes the touch panel 810 and the optical adhesive layer 820 between the reflective display 130 and the light guide plate 210. The light guide plate 210 is adhered to the touch panel 810 though the optical adhesive layer 820. The reflective display 130 is adhered to the touch panel 810 though the optical adhesive layer 264.

Figure 9:
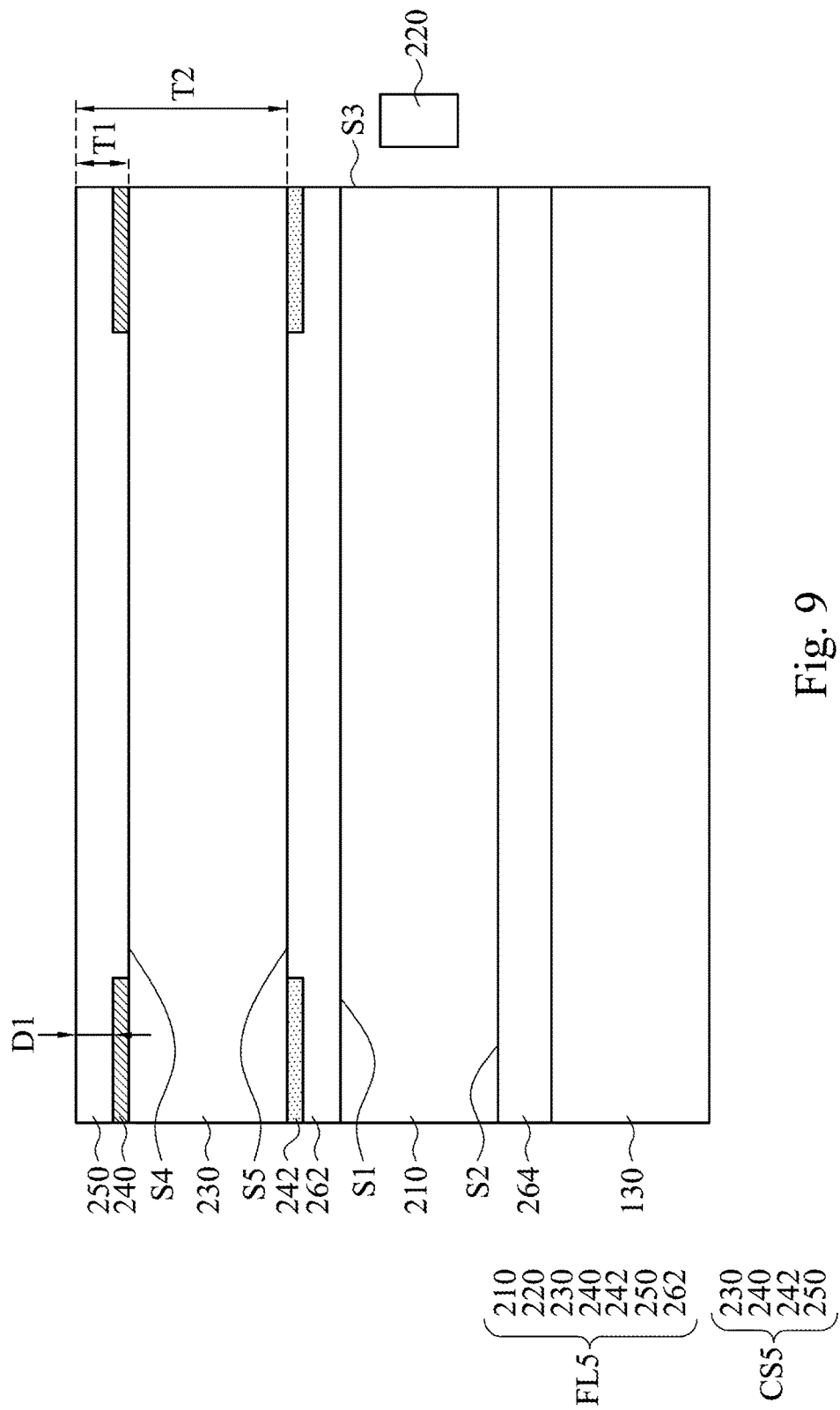

FIG. 9 is a cross-section view of a display device 900 according to another embodiment of the present disclosure. The display device 900 includes a front light module FL5, a reflective display 130, an optical adhesive layer 264. The front light module FL5 includes a light guide plate 210, a light source 220, a light-transmitting substrate 230, a first light-shielding layer 240, a second light-shielding layer 242, a light-transmitting covering layer 250 and an optical adhesive layer 262. Among these, the light-transmitting substrate 230 along with the first light-shielding layer 240, the second light-shielding layer 242, and the light-transmitting covering layer 250 forms a cover plate structure CS5. The difference between the display device 900 in FIG. 9 and the display device 200 in FIG. 2 is that the display device 900 includes the second light-shielding layer 242 which is disposed on the edge of the lower surface S5 of the light-transmitting substrate 230 and directly contacts the lower surface S5 of the light-transmitting substrate 230. Please refer to the material and the fabrication method of the first light-shielding layer 240 mentioned above for the material and the fabrication method of the second light-shielding layer 242. In one embodiment, the first light-shielding layer 240 overlaps the second light-shielding layer 242.

Figure 10:
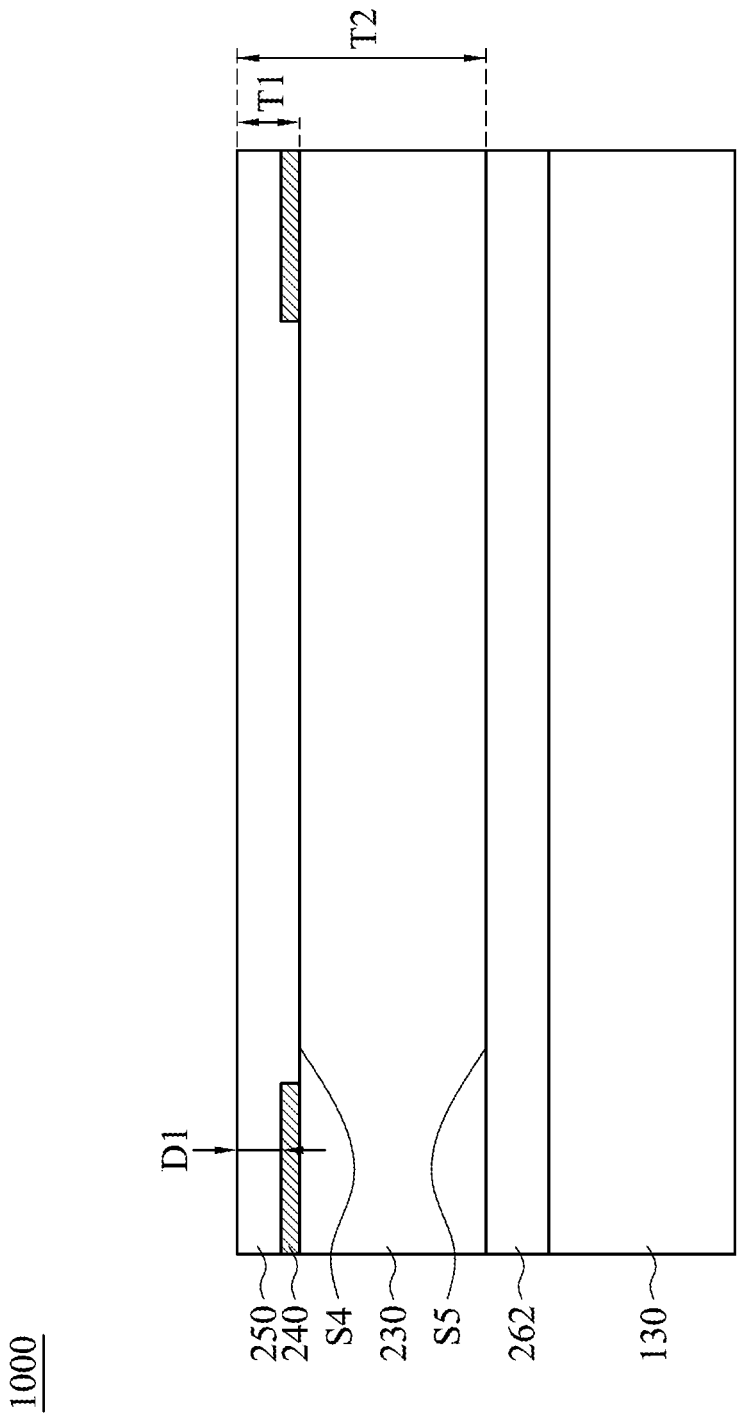

In one embodiment, the light guide plate 210, the light source 220 and the optical adhesive layer 264 in the display device 200 can be omitted. FIG. 10 is a cross-section view of a display device 1000 according to another embodiment of the present disclosure. The display device 1000 includes the cover plate structure CS1, the reflective display 130 and the optical adhesive layer 262. The difference between the display device 1000 in FIG. 10 and the display device 200 in FIG. 2 is that the display device 200 includes the light guide plate 210, the light source 220 and the optical adhesive layer 264, yet the display device 1000 does not include those elements mentioned above. More specifically, in the display device 1000, the optical adhesive layer 262 is in direct contact with the cover plate structure CS1, for binding the cover plate structure CS1 and the optical adhesive layer 262 together.

In other embodiments, the light guide plates 210, the light sources 220 and the optical adhesive layers 264 in the display devices 400, 500, 600, 700 and 900 can also be omitted.

Figure 11:
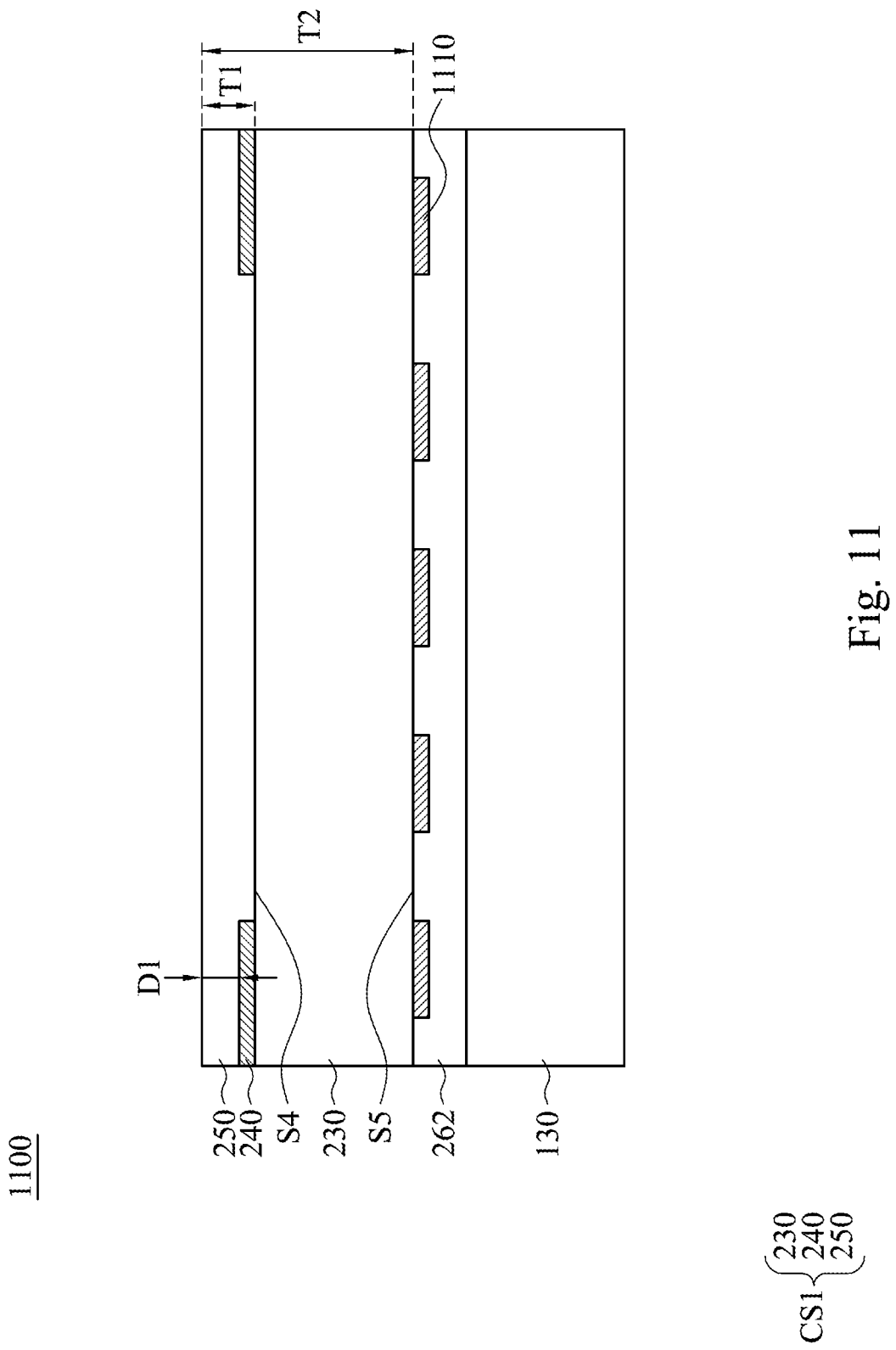

FIG. 11 is a cross-section view of a display device 1100 according to another embodiment of the present disclosure. The display device 1100 includes a cover plate structure CS1, a reflective display 130, an optical adhesive layer 262 and a touch circuit 1110. The difference between the display device 1100 in FIG. 11 and the display device 1000 in FIG. 10 is that the display device 1100 includes the touch circuit 1110, which is on the lower surface S5 of the light-transmitting substrate 230 of the cover plate structure CS1. More specifically, the touch circuit 1110 is in direct contact with the lower surface S5 of the light-transmitting substrate 230.

Figure 12:
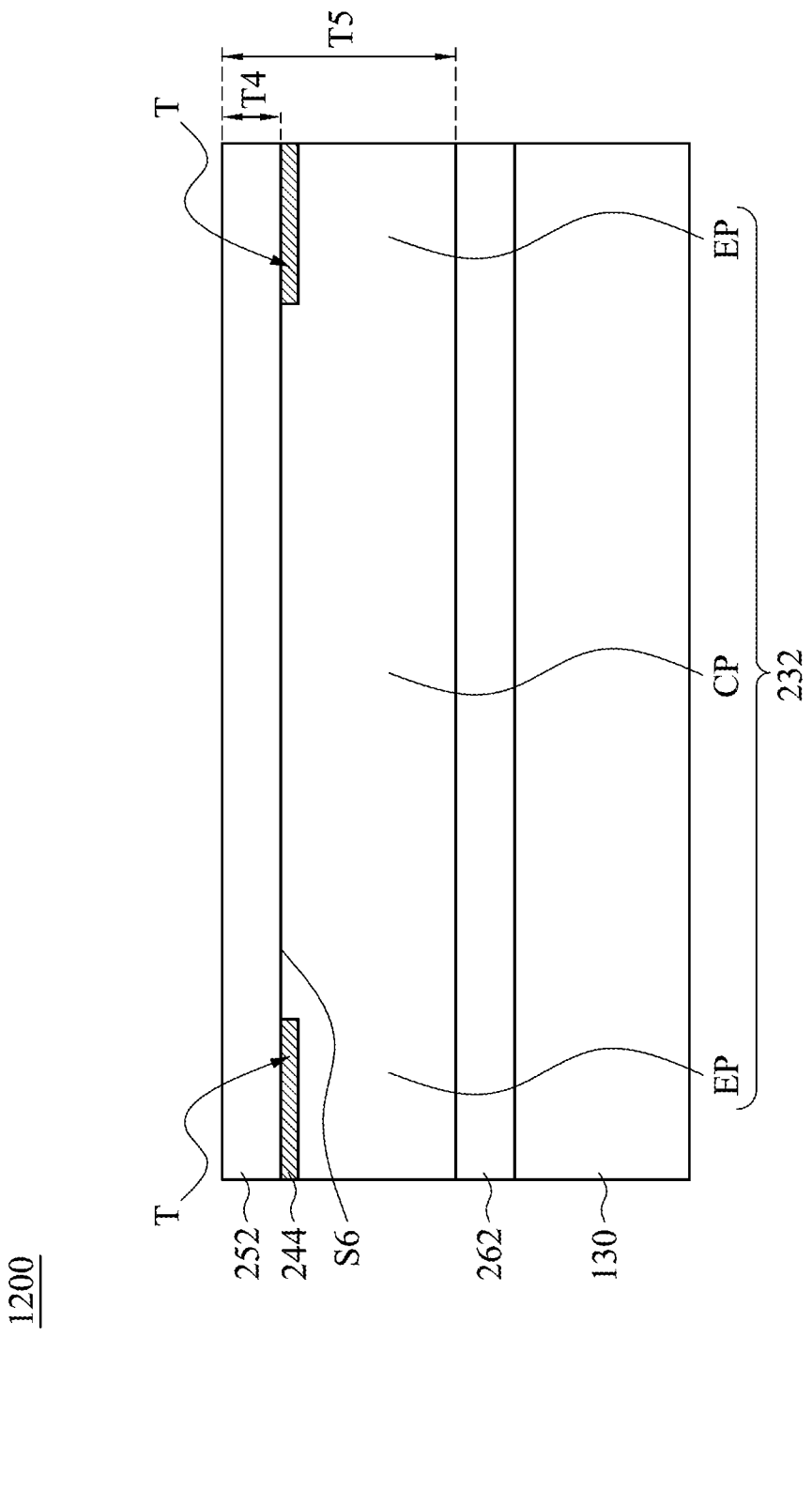

FIG. 12 is a cross-section view of a display device 1200 according to another embodiment of the present disclosure. The display device 1200 includes a light-transmitting substrate 232, a light-shielding layer 244, a light-transmitting covering layer 252, a reflective display 130 and an optical adhesive layer 262. Among these, the light-transmitting substrate 232, the light-shielding layer 244 and the light-transmitting covering layer 252 form a cover plate structure CS6.

More specifically, the light-transmitting substrate 232 has a central portion CP and an edge portion EP surrounding the central portion CP. The thickness of the central portion CP is greater than the thickness of the edge portion EP. The light-shielding layer 244 is located on the edge portion EP and in direct contact with the edge portion EP. The light-transmitting covering layer 252 is located on the light-shielding layer 244 and the light-transmitting substrate 232, and in direct contact with both the light-shielding layer 244 and the light-transmitting substrate 232. In one embodiment, the material of the light-transmitting substrate 232 includes glass, polymethylmethacrylate (PMMA), polycarbonate (PC), polyethylene terephthalate (PET), cyclo-olefin polymers (COP), cyclic olefin copolymer (COC), polyethylene (PE), polyetheretherketone (PEEK), polyethylene naphthalate (PEN), polyimide (PI), polyetherimide (PEI) or a combination thereof. Besides, please refer to the embodiments illustrated in FIG. 2-11. A front light module, a touch panel, a touch circuit, a light-shielding layer, an optical adhesive layer, or a combination thereof can be disposed between the light-transmitting substrate 232 and the reflective display 130.

In one embodiment, the light-shielding layer 244 can be fabricated on the edge portion EP through the following steps. First, a light-transmitting substrate (not shown here) is etched along its edge to form a trench T for forming the light-transmitting substrate 232. Therefore, the light-transmitting substrate 232 has the central portion CP and the edge portion EP surrounding the central portion CP, and the trench T formed on the edge portion EP surrounds the central portion CP. Then, the light-shielding layer 244 is formed in the trench T, namely, the light-shielding layer 244 which surrounds the central portion CP is formed on the edge portion EP. Subsequently, the light-transmitting covering layer 252 is formed to cover the central portion CP of the light-transmitting substrate 232 and the light-shielding layer 244. In one embodiment, the light-shielding layer 244 and the upper surface S6 of the central portion CP of the light-transmitting substrate 232 are coplanar. Please refer to the material and the fabrication method of the first light-shielding layer 240 mentioned above for the material and the fabrication method of the light-shielding layer 244. Since the light-shielding layer 244 may be a ink-printed layer or a photoresist layer, the light-shielding layer 244 can be formed directly on the light-transmitting substrate 232 for being in direct contact with the light-transmitting substrate 232. Because no additional adhesive layer is required to bind the light-transmitting substrate 232 to the light-shielding layer 244, the cover plate structure CS6 could be lighter and thinner.

In one embodiment, the thickness T4 of the light-transmitting covering layer 252 accounts for 1%-33% of the total thickness T5 of the light-transmitting substrate 232, the light-shielding layer 244 and the light-transmitting covering layer 252. In another embodiment, the thickness T4 of the light-transmitting covering layer 252 accounts for 1%-15% of the total thickness T5 of the light-transmitting substrate 232, the light-shielding layer 244 and the light-transmitting covering layer 252.

In conclusion, in the embodiments of the present disclosure, the all light-shielding layers are in direct contact with the light-transmitting substrates. Moreover, the light-transmitting covering layers can directly cover the light-shielding layers and the light-transmitting substrates, or adhere to the light-shielding layers and the light-transmitting substrates through the optical adhesive layers. The structural design of the cover plate structures mentioned above can decrease the distance between the upper surface of the light-shielding layer and the upper surface of the light-transmitting covering layer as far as possible. Therefore, when the light beam emitted from the light source or the front light module is reflected by the reflective display, the light leakage is not easy to happen in the non-display region of the display device, improving the display performance of the display device and having the advantage of being lighter and thinner.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cover plate structure for a display device, comprising:
   a light-transmitting substrate having a flat upper surface and a lower surface;
   a light-transmitting covering layer over the light-transmitting substrate; and
   a first light-shielding layer disposed between the light-transmitting substrate and the light-transmitting covering layer, and located on an edge of the flat upper surface of the light-transmitting substrate and in contact with the flat upper surface, wherein a total thickness of the first light-shielding layer and the light-transmitting covering layer accounts for 1%-33% of a total thickness of the light-transmitting substrate, the first light-shielding layer and the light-transmitting covering layer.

2. The cover plate structure of claim 1, wherein the light-transmitting covering layer comprises a hard coating layer, an anti-glare layer, or a combination thereof.

3. The cover plate structure of claim 1, wherein the light-transmitting covering layer conformally covers the first light-shielding layer and the light-transmitting substrate.

4. The cover plate structure of claim 1, wherein the light-transmitting covering layer comprises an optically adhesive layer and a hard coating layer, and the hard coating layer is disposed on the optically adhesive layer.

5. The cover plate structure of claim 1, wherein the light-transmitting covering layer comprises an optically adhesive layer and an anti-glare layer, and the anti-glare layer is disposed on the optically adhesive layer.

6. The cover plate structure of claim 1, wherein a material of the light-transmitting substrate comprises glass, polymethylmethacrylate, polycarbonate, polyethylene terephthalate, cyclo-olefin polymer, cyclic olefin copolymer, polyethylene, polyetheretherketone, polyethylene naphthalate, polyimide, polyetherimide, or a combination thereof.

7. The cover plate structure of claim 1, further comprising a second light-shielding layer disposed on an edge of the lower surface of the light-transmitting substrate.

8. A display device, comprising:
a reflective display; and
the cover plate structure of claim 1 disposed on the reflective display.

9. The display device of claim 8, further comprising a touch circuit on the lower surface of the light-transmitting substrate.

10. The display device of claim 8, further comprising a touch panel between the reflective display and the cover plate structure of claim 1.

11. The display device of claim 8, wherein the light-transmitting covering layer comprises a hard coating layer, an anti-glare layer, or a combination thereof.

12. The display device of claim 8, further comprising a light guide plate and a light source, wherein the light guide plate is located between the reflective display and the cover plate structure of claim 1, and the light source is disposed next to a side of the light guide plate.

13. The display device of claim 12, further comprising a touch panel between the light guide plate and the cover plate structure of claim 1.

14. The display device of claim 12, further comprising a touch panel between the reflective display and the light guide plate.

15. A cover plate structure for a display device, comprising:
a light-transmitting substrate having a central portion and an edge portion surrounding the central portion, wherein a thickness of the central portion is greater than a thickness of the edge portion;
a light-shielding layer located on the edge portion; and
a light-transmitting covering layer located on the light-shielding layer and the light-transmitting substrate, wherein a material of the light-transmitting substrate comprises glass, polymethylmethacrylate, polycarbonate, polyethylene terephthalate, cyclo-olefin polymer, cyclic olefin copolymer, polyethylene, polyetheretherketone, polyethylene naphthalate, polyimide, polyetherimide, or a combination thereof.

* * * * *